United States Patent
Oostveen et al.

(10) Patent No.: US 8,151,168 B2
(45) Date of Patent: Apr. 3, 2012

(54) METHOD, APPARATUS AND SYSTEM FOR ERROR DETECTION AND SELECTIVE RETRANSMISSION

(75) Inventors: Job Cornelis Oostveen, Eindhoven (NL); Chin Keong Ho, Eindhoven (NL); Franciscus Maria Joannes Willems, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1041 days.

(21) Appl. No.: 12/067,981

(22) PCT Filed: Sep. 21, 2006

(86) PCT No.: PCT/IB2006/053424
§ 371 (c)(1),
(2), (4) Date: Mar. 25, 2008

(87) PCT Pub. No.: WO2007/036855
PCT Pub. Date: Apr. 5, 2007

(65) Prior Publication Data
US 2008/0232365 A1    Sep. 25, 2008

(30) Foreign Application Priority Data
Sep. 28, 2005   (EP) .................... 05108967

(51) Int. Cl.
*H03M 13/00* (2006.01)
(52) U.S. Cl. ........................ 714/776
(58) Field of Classification Search .......... 714/712, 714/713, 746–749, 751–755, 758, 776–780, 714/786, 799, 800
See application file for complete search history.

(56) References Cited

U.S. PATENT DOCUMENTS

| | | | | |
|---|---|---|---|---|
| 5,537,429 A | * | 7/1996 | Inoue | 714/755 |
| 6,438,723 B1 | | 8/2002 | Kalliojarvi | |
| 7,080,307 B2 | * | 7/2006 | Kondo | 714/758 |
| 2003/0051206 A1 | * | 3/2003 | Kondo | 714/795 |
| 2004/0160943 A1 | * | 8/2004 | Cain | 370/351 |
| 2006/0280205 A1 | * | 12/2006 | Cho | 370/473 |

FOREIGN PATENT DOCUMENTS

| | | |
|---|---|---|
| EP | 0786880 A2 | 7/1997 |
| EP | 0948154 A2 | 10/1999 |

OTHER PUBLICATIONS

Samir Kallel, et al: Sequential Decoding with an Efficient Partial Retransmission ARQ Strategy, IEEE Transactions on Communications, vol. 39, No. 2, Feb. 1991, pp. 208-213.

* cited by examiner

*Primary Examiner* — Nadeem Iqbal
(74) *Attorney, Agent, or Firm* — Larry Liberchuk

(57) ABSTRACT

The invention relates to a method for use in a packet-switched communication system, the method comprising: sending a first packet from a source node to a destination node, the first packet containing a first set of data bits; sending a second packet from the source node to the destination node, the second packet containing a second set of data bits; wherein, in the event that the first set of data bits cannot be successfully decoded in the destination node, the second packet further comprises a first set of error correction bits for the first set of data bits.

15 Claims, 2 Drawing Sheets

METHOD, APPARATUS AND SYSTEM FOR ERROR DETECTION AND SELECTIVE RETRANSMISSION

The invention relates to a method and apparatus for a packet-switched wireless communication system that uses automatic packet repeat requests, and in particular relates to a method and apparatus by which the effective data rate can be increased in such a system.

In some wireless communication systems, such as specified in IEEE 802.11 standards for wireless LANs, a packet switched approach is adopted whereby the transmitter sends information to a receiver in blocks of data called packets. The packets can be transmitted from the base station to different mobile receivers, and vice versa, in a centralized network, or in an adhoc manner in a peer-to-peer network. The effective rate at which data is transferred from the transmitters to the receivers is known as the throughput.

Only packets that are received correctly contribute towards the effective data throughput. The throughput is defined as the average number of bits received correctly in the communication system per second.

In automatic repeat request (ARQ) systems, a packet is automatically retransmitted if the error detection algorithm indicates that the packet has been received with errors.

In a Type I hybrid ARQ system, a forward error correcting code (FEC) is combined with the error detection algorithm. This allows the more commonly occurring error patterns to be handled using the FEC and for the less commonly occurring error patterns to be handled by requesting a packet retransmission.

In an ARQ or Type I hybrid ARQ system, the packets that initiate the retransmission requests are generally discarded in the receiver.

In a Type II hybrid ARQ system, a FEC is again combined with an error detection algorithm, but packets that initiate retransmission requests are stored and later combined with the retransmitted copy or copies of the packet, resulting in a single packet that is more reliable than any of its constituent packets.

In some Type II hybrid ARQ systems, further redundant (or error correction) bits are added each time a packet is retransmitted and decoding is carried out at each stage with increasing reliability. A well-known code that achieves incremental redundancy is the rate compatible punctured convolutional code (RCPC). Extensions to capacity achieving codes have been carried out by replacing the convolutional code with a turbo code or with a low-density parity-check code. In these systems, a packet is sent at the highest code rate, then redundancy bits are sent incrementally until the packet is decoded correctly.

In each of these systems, no new data is sent to the receiver until the previous packet has been successfully decoded. If no new data is transmitted, then the data rate is restricted. For example sending one redundant data packet reduces the effective data rate by half, and sending two redundant data packets reduces the effective data rate by two thirds.

There is therefore a need for a method and apparatus for an automatic repeat request packet switched wireless communication system that overcomes these disadvantages.

According to a first aspect of the invention, there is provided a method for use in a packet-switched communication system, the method comprising: sending a first packet from a source node to a destination node, the first packet containing a first set of data bits; and sending a second packet from the source node to the destination node, the second packet containing a second set of data bits; wherein, in the event that the first set of data bits cannot be successfully decoded in the destination node, the second packet further comprises a first set of error correction bits for the first set of data bits.

According to a second aspect of the invention, there is provided a source node for use in a packet-switched communication system, the source node comprising means for sending data packets to a destination node, each data packet comprising a respective set of data bits; and means for receiving an acknowledgement from the destination node for each data packet indicating whether each data packet has been successfully decoded in the destination node; wherein, in the event that the acknowledgement indicates that a data packet cannot be successfully decoded in the destination node, the means for sending is further adapted to send, with the next data packet that comprises a respective set of data bits, a set of error correction bits for the data bits in the data packet that contains errors.

According to a third aspect of the invention, there is provided a destination node for use in a packet-switched communication system, the destination node comprising means for receiving data packets from a source node, each data packet comprising a respective set of data bits; and means for determining if each received data packet can be successfully decoded by the destination node; wherein, in the event that a data packet cannot be successfully decoded by the destination node, the means for receiving is further adapted to receive, with the next data packet that comprises a respective set of data bits, a set of error correction bits for the data bits in the packet that contains errors.

According to a fourth aspect of the invention, there is provided a packet-switched communication system comprising a source node and destination node as described above.

The invention will now be described, by way of example only, with reference to the following drawings, in which.

Figure 1:
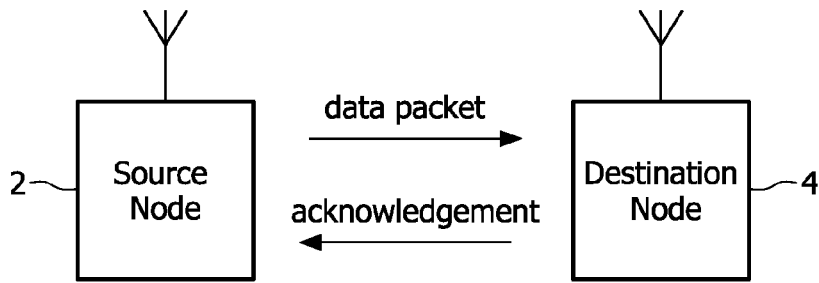
FIG. 1 shows a wireless communication system according to the invention.

FIG. 1 shows a wireless communications system according to the invention comprising a source node 2 and a destination node 4. The source node 2 divides data to be transmitted into a number of packets, encodes the data using an error detection algorithm, and transmits each packet in turn to the destination node 4.

When the destination node 4 receives a packet, some error detection operation is performed to determine if the packet has been correctly received, and the destination node 4 sends an acknowledgement signal to the source node 2. In some embodiments of the invention, the acknowledgement signal comprises a single bit, with one value (say '1') indicating that the packet has been received without errors and the other value (say '0') indicating that there are errors in the received packet. In alternative preferred embodiments of the invention, the ACK signal comprises K bits if K packets have been sent so far, or a number of bits L (where L is less than K). In these alternative embodiments, each bit in the ACK signal indicates the status of one particular packet that has been previously transmitted to the destination node.

In the following description of the invention, a number of assumptions about the communications system have been made. Firstly, the acknowledgement (ACK) signal is error and delay free. Secondly, the acknowledgement signal is received at the source node 2 before the next transmission is made. Thirdly, the destination node 4 knows the rate used for transmission by the source node 2. Fourthly, the average signal-to-noise ratio (SNR) and the channel distribution are known. The channel distribution can be based on models obtained from some channel measurement operation, and the average SNR is a parameter that changes slowly and can be calculated accurately over a long observation period, or set to some fixed value corresponding to the worst-case scenario. This assumption allows the average data throughput to be determined. For the sake of simplicity, a fifth assumption is that the packet period is fixed. However, it will be readily appreciated that a fixed packet period is not required in embodiments of the present invention. In addition, in the illustrated embodiment, the data rate used to transmit the packets is constant. However, in alternative embodiments of the invention, the data rate used to transmit the packets varies from packet to packet.

As described above, in a Type II hybrid ARQ system, a FEC is combined with an error detection algorithm, and packets that initiate retransmission requests are stored and later combined with the retransmitted copy or copies of the packet, resulting in a single packet that is more reliable than any of its constituent packets. In further Type II hybrid ARQ systems, new redundant (or error correction) bits are added each time a packet is retransmitted and decoding is carried out at each stage with increasing reliability. However, in these systems, new data bits are not sent to the destination node 4 until the erroneous packets are recovered or until a specified time is exceeded.

Figure 2:
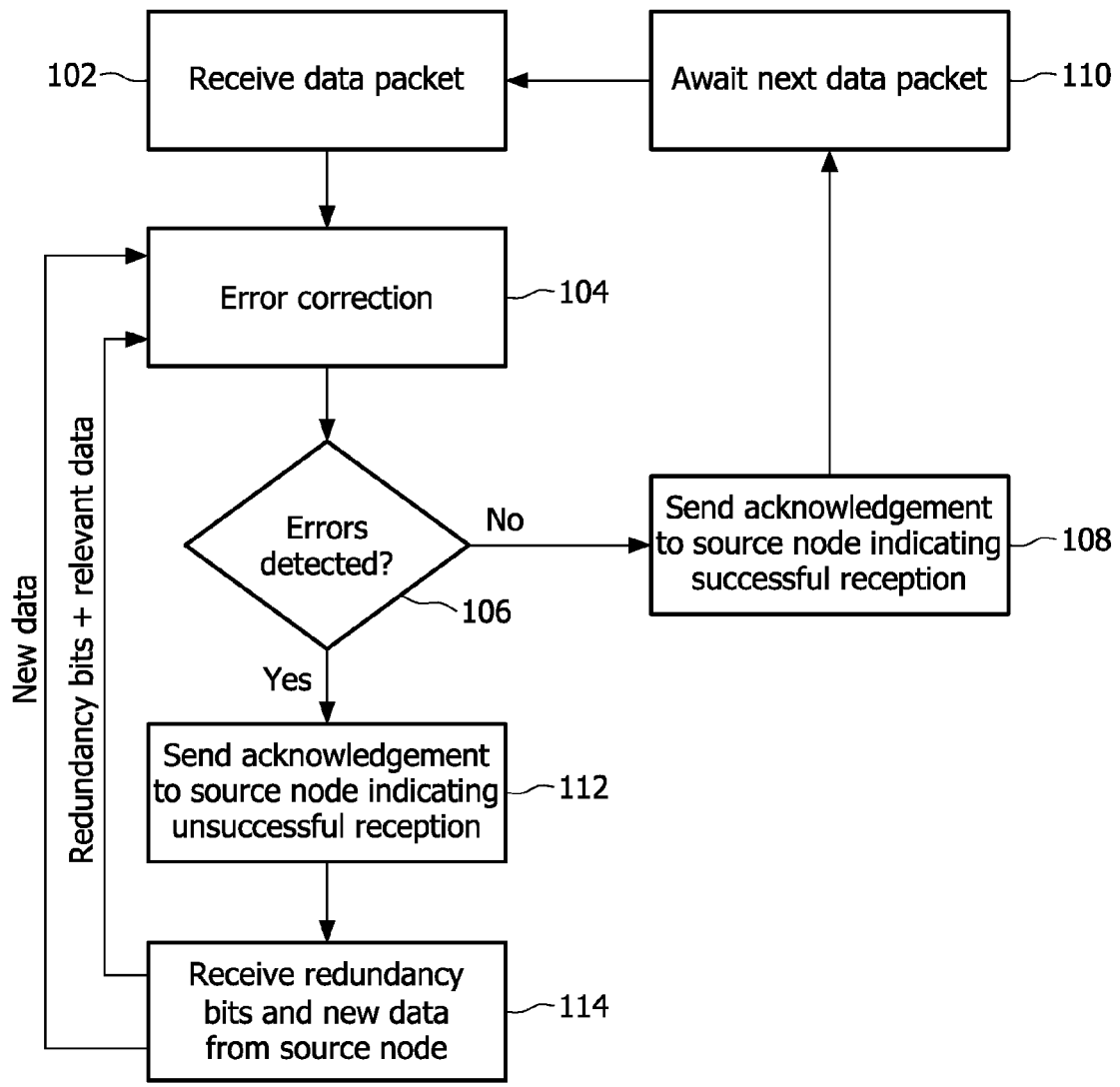
FIG. 2 shows a method according to the invention.

In accordance with the invention, when a data packet is received in the destination node 4, and the error correction algorithm (if present) is unable to correct errors in the data packet, a retransmission request is sent to the source node 2. FIG. 2 illustrates a method in accordance with the invention.

In step 102, a data packet is received by the destination node 4. The destination node 4 uses an error correction algorithm to produce a received codeword from the received data packet (step 104). Examples of suitable error correction algorithms are rate compatible punctured convolutional code, turbo code, low density parity check code (RCPC, RC-TC, RC-LDPC).

Then, in step 106, an error detection algorithm is used to detect if there are errors in the received codeword. In a preferred embodiment of the invention, a cyclic redundancy check (CRC) is used as the error detection algorithm. Alternatively, a single bit parity check can be used. In either case, the source node includes some 'check data' with the data bits, which the destination node then uses to verify the accuracy of the received data bits. If this verification fails, then it is likely that the received codeword has not been decoded correctly.

If no errors are detected in step 106, an acknowledgement signal is sent to the source node 2 indicating that the packet has been received without errors (step 108). This acknowledgement signal comprises one or more bits as described above. The destination node 4 then awaits receipt of the next data packet (step 110).

If errors are detected in the received codeword, the process moves to step 112, in which the destination node 4 sends an acknowledgement signal (comprising one or more bits) to the source node 2 indicating that the packet has been received with errors.

In accordance with the invention, in response to the acknowledgement signal sent in step 112, the source node 2 sends redundancy bits for the data in the previous packet and new data in the next packet sent to the destination node 4. The redundancy bits are derived in a manner appropriate to the error correction algorithm in use. For example, in the case of RCPC, the redundancy bits are derived and stored by the source node when the packet is first encoded using a convolutional code. Typically, such a code is designed such that the receiver is able to decode each additional packet with increasing reliability.

Alternatively, the redundancy bits can be derived by the source node as and when they are required for transmission to the destination node. The exact implementation depends on the error correction algorithm used in the system.

In further alternative embodiments of the invention, additional redundancy bits can be generated using a different error correction algorithm to that used to generate the redundancy bits transmitted initially with the data bits. As different error correction algorithms can correct particular errors better than others, this embodiment of the invention increases the chance that the transmitted packet can be successfully received.

In the destination node 4, the packet is received (step 114) and the new data in the packet is passed to the error correction stage (step 104) to determine a received codeword. The process for the new data then proceeds as described above. For example, if the received codeword does not contain errors, i.e. the new data has been successfully received, then a positive acknowledgement signal relating to the new data is sent to the source node (step 108). However, if the new data has not been successfully received, a negative acknowledgement signal relating to the new data is sent to the source node (step 112), and the destination node 4 awaits receipt of redundancy bits for the new data in the next packet (step 114).

The redundancy bits for the data in the previous packet are provided to the error correction stage (step 104) along with the data from the previous packet to determine if the errors can now be corrected. A revised codeword is generated and the error detection algorithm determines if there are errors in this revised codeword (step 106).

If the errors in the previous data can now be corrected using the additional redundancy bits, an acknowledgement signal is sent to the source node indicating that the data has now been successfully received (step 108) and the process repeats with the next data packet.

If the errors in the previous data still cannot be corrected using the additional redundancy bits, an acknowledgement signal is sent to the source node indicating that the previous data has still not been successfully received (step 112), and the destination node 4 awaits receipt of further redundancy bits for the data in the previous packet from the source node 2. As mentioned above, the further redundancy bits may comprise redundancy bits generated from the same error correction algorithm as that used to generate the previous redundancy bits, or may be generated by a different error correction algorithm.

When these further redundancy bits are received from the source node 2, the process returns to step 110 where it is determined whether the errors in the previous data can be corrected using the redundancy bits previously received and the further redundancy bits. The process then continues as described above.

In an alternative embodiment of the invention, no redundancy bits may be included with the relevant new data in each packet. This means that the error correction step (step 104) in FIG. 2 can be skipped for any new data in a particular packet. If errors are detected in the new data (step 106), error correction can be carried out once redundancy bits have been received in the next packet.

In a further alternative embodiment of the invention, the destination node 4 can refrain from transmitting an acknowledgement signal to the source node 2 if the previously received data packet cannot be successfully decoded in the destination node 4 (step 112). If the source node 2 does not receive an acknowledgement signal within a predetermined time limit, the source node 2 assumes that one or more previous packets have been received with errors, and therefore it includes error correction bits in the next packet, as described above.

Figure 3:
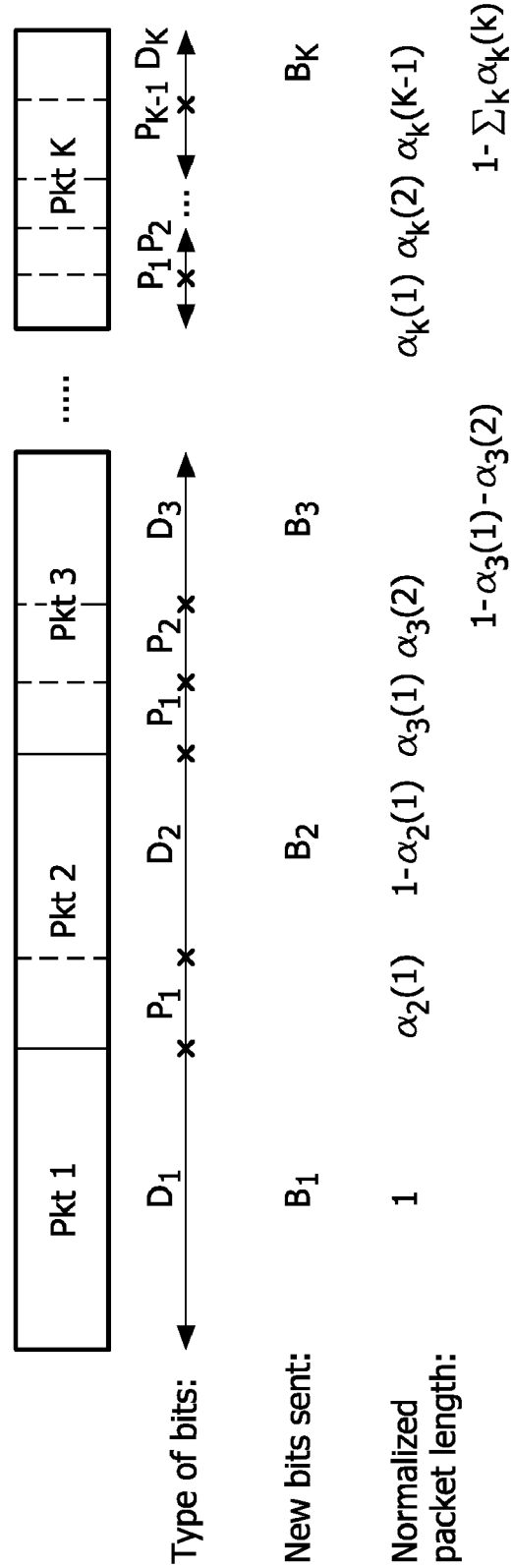
FIG. 3 shows a packet structure used in the system according to the invention.

FIG. 3 shows an exemplary packet structure in accordance with the invention. The data to be transmitted from the source node 2 to the destination node 4 is divided into a 'super' packet consisting of 'K' packets. The super packet is also described as a K-packet herein.

FIG. 3 shows an exemplary packet structure when K−1 consecutive packets are erroneous in a K-packet. In general, it is possible that less than K−1 consecutive packets are erroneous, and the consecutive erroneous packets need not start in the first packet. Furthermore, there could be 2 or more consecutive bursts of erroneous packets within a K-packet. However, for each burst, regardless of burst length and start position, the method for performing packet coding is the same. The data rates used and other parameters to be used depend on the actual situation. All the timing periods in FIG. 3 are normalized to the packet interval, so the packet interval is treated as 1 second.

$D_k$ and $P_k$ denote the types of bits sent in the packets. $D_k$ denotes the data bits, and, as described above, can also include some redundancy or error detection bits. $P_k$ denotes further redundancy bits for $D_k$. A main distinction between $D_k$ and $P_k$ is that new data bits are first introduced in $D_k$.

In the exemplary packet structure shown in FIG. 3, every packet is received with errors and therefore each subsequent packet contains redundancy bits for the previous packet and further redundancy bits for any earlier packets. For example, Pkt 1 is received with errors, and redundancy bits for the data in Pkt 1 ($P_1$) are sent in Pkt 2. The new data ($D_2$) in Pkt 2 is also received with errors, and the redundancy bits for this data ($P_2$) are included in the third packet (Pkt 3). The first set of redundancy bits for $D_1$ in Pkt 2 are not sufficient to correct the errors in $D_1$ so further redundancy bits for $D_1$ are sent in Pkt 3.

As the number of new data bits in each packet (e.g. $D_3$) depends on the number of redundancy bits (e.g. $P_1$ and $P_2$, or $P_1$ or $P_2$) being transmitted, the error correction bit generation algorithm is selected to be able to deal with the different numbers of data bits being transmitted in each packet.

As an example of an embodiment of the above-described invention, consider two packets, Pkt 1 and Pkt 2. Suppose that the data in Pkt 1, $D_1$, is received with errors. Pkt 2 will include redundancy bits $P_1$ for the data in Pkt 1. The new data bits in Pkt 2, denoted $D_2$, will be encoded in the same way as $P_1$ and $D_1$ so that the effective data rate is the same.

For example, when RCPC is used for encoding, information bits in Pkt 1, s1, s2, s3, s4 . . . , become, after convolutional encoding, b1, b2, b3, . . . . Pkt 1 will include odd numbered bits b1, b3, b5, . . . . Since Pkt 1 is erroneous, Pkt 2 will include the additional redundant bits b2, b4, b6, . . . .

The new information bits for Pkt 2 are t1, t2, t3 . . . , which become c1, c2, c3, . . . after encoding. To maintain the same data rate as $P_1$ and $D_1$, the bits c1, c3, c5, . . . are sent in the second packet.

It should be noted that the notations in FIG. 3 are used to denote the bit types rather than the actual bit contents. The redundancy bits are generated from the data bits using an encoder in the source node 2. Any suitable encoder based on the rate compatible code convolutional code/turbo code/LDPC code can be used.

There is therefore provided a method and apparatus for an automatic repeat request packet switched wireless communication system that allows new data to be provided to the destination node, even when previous packets have not yet been successfully decoded.

The invention claimed is:

1. A method for use in a packet-switched communication system, the method comprising:
   sending a first packet from a source node to a destination node, the first packet containing a first set of data bits; and
   in the event that the first set of data bits cannot be successfully decoded in the destination node, sending a second packet from the source node to the destination node, the second packet containing a second set of data bits;
   wherein the second packet further comprises a first set of error correction bits for the first set of data bits.

2. A method as claimed in claim 1, further comprising:
   in the event that the first set of data bits cannot be successfully decoded using the first set of error correction bits for the first set of data bits, including in a third packet sent from the source node to the destination node a third set of data bits and a second set of error correction bits for the first set of data bits.

3. A method as claimed in claim 1, further comprising:
   in the event that the first set of data bits cannot be successfully decoded using the first set of error correction bits for the first set of data bits, and in the event that the second set of data bits cannot be successfully decoded in the destination node, including in a third packet sent from the source node to the destination node a third set of data bits, a second set of error correction bits for the first set of data bits and a first set of error correction bits for the second set of data bits.

4. A method as claimed in claim 2, wherein each set of error correction bits for a particular set of data bits is derived using different error correction algorithms.

5. A method as claimed in claim 2, wherein each set of error correction bits for a particular set of data bits is derived using the same error correction algorithm.

6. A method as claimed in claim 4, wherein the error correction algorithm or algorithms are selected from rate compatible punctured convolutional code, rate compatible turbo code or rate compatible low density parity check code.

7. A method as claimed in claim 1, wherein, on receipt of a packet, the destination node sends an acknowledgement signal to the source node, the acknowledgement signal indicating whether that packet has been successfully decoded.

8. A method as claimed in claim 7, wherein the acknowledgement signal further indicates whether a predetermined number of previously received packets have been successfully decoded.

9. A method as claimed in claim 1, wherein the error correction bits are derived in the source node before the relevant packet is sent to the destination node.

10. A method as claimed in claim 7, wherein the error correction bits are derived in the source node on receipt of an acknowledgement signal indicating that a previously transmitted packet has not been successfully decoded.

11. A method as claimed in claim 1, wherein each data packet further comprises a set of error detection bits for the data bits contained in said packet.

12. A source node for use in a packet-switched communication system, the source node comprising:
    means for sending data packets to a destination node, each data packet comprising a respective set of data bits; and
    means for receiving an acknowledgement from the destination node for each data packet indicating whether each data packet has been successfully decoded in the destination node;
    wherein, in the event that the acknowledgement indicates that a data packet cannot be successfully decoded in the destination node, the means for sending is further adapted to send, with the next data packet that comprises a respective set of data bits, a set of error correction bits for the data bits in the data packet that contains errors.

13. A destination node for use in a packet-switched communication system, the destination node comprising:
    means for receiving data packets from a source node, each data packet comprising a respective set of data bits; and
    means for determining if each received data packet can be successfully decoded by the destination node;
    wherein, in the event that a data packet cannot be successfully decoded by the destination node, the means for receiving is further adapted to receive, with the next data packet that comprises a respective set of data bits, a set of error correction bits for the data bits in the packet that contains errors.

14. A packet-switched communication system comprising a source node and a destination node, the destination node comprising means for receiving data packets from the source node, each data packet comprising a respective set of data bits, and means for determining if each received data packet can be successfully decoded by the destination node, wherein if a data packet cannot be successfully decoded by the destination node, the means for receiving is further adapted to receive, with the next data packet that comprises a respective set of data bits, a set of error correction bits for the data bits in the packet that contains errors.

15. A packet-switched communication system comprising a source node and a destination node, the source node including means for sending data packets to a destination node, each data packet comprising a respective set of data bits, and means for receiving an acknowledgement from the destination node for each data packet indicating whether each data packet has been successfully decoded in the destination node, wherein if the acknowledgement indicates that a data packet cannot be successfully decoded in the destination node, the means for sending is further adapted to send, with the next data packet that comprises a respective set of data bits, a set of error correction bits for the data bits in the data packet that contains errors.

* * * * *